(No Model.)
L. LUPPEN.
CULTIVATOR.
No. 255,877. Patented Apr. 4, 1882.
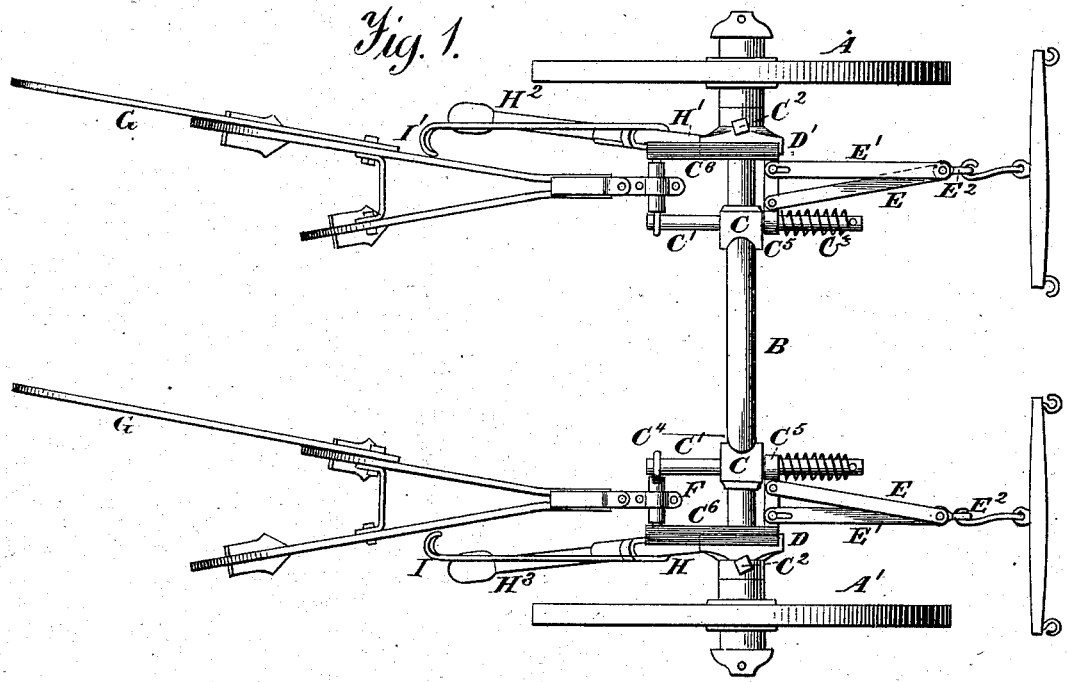
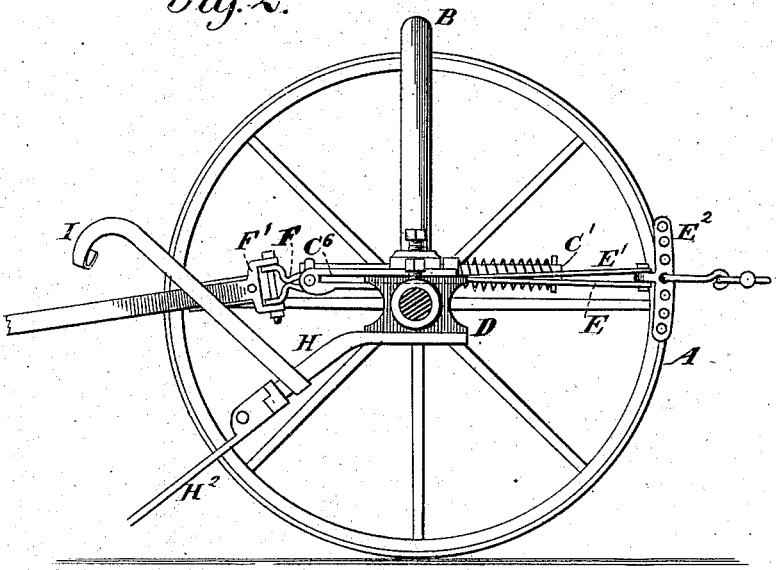
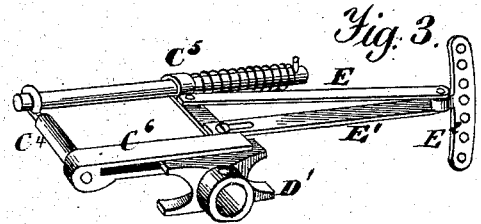
Witnesses.
A. Ruppert
C. M. Connell
L. Luppen
Inventor.
Holloway & Blanchard
Atty

UNITED STATES PATENT OFFICE.

LUPPE LUPPEN, OF PEKIN, ILLINOIS.

CULTIVATOR.

SPECIFICATION forming part of Letters Patent No. 255,877, dated April 4, 1882.

Application filed October 18, 1881. (No model.)

*To all whom it may concern:*

Be it known that I, LUPPE LUPPEN, a citizen of the United States, residing at Pekin, in the county of Tazewell and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to machines for cultivating corn and other crops; and the object of my improvements is to provide certain novel combinations of devices for the purposes hereinafter described.

Figure 1 is a plan view of my improved cultivator, showing the construction and arrangement of its parts. Fig. 2 is a sectional elevation, and Fig. 3 is a perspective view of some of the parts in detail.

Similar letters refer to similar parts throughout the several views.

In constructing cultivators of this type there are provided two carrying-wheels, A A', which may be of any desired dimensions and of any approved construction. These wheels are mounted upon the arched axle B, to which they are secured by a pin or nut in the usual manner, but so as to turn freely thereon. This axle may be made of a round or otherwise formed bar of metal, it having upon its outer ends the required wheel-seats.

In making provision for drawing the implement forward there is placed upon its axle, at or near the point where the vertical portions join the horizontal portions, clips C C, which are firmly secured thereto by set-screws or in any other suitable manner. These clips are provided with an aperture in the direction of the path of the implement, through which pass rods of metal C', which are held in position by the set-screws $C^2$ $C^2$. On the forward ends of the rods C' spiral springs $C^3$ $C^3$ are placed, they being held thereon by pins or nuts. Resting upon the rods C', on either side of the axle, are two arms, $C^4$ $C^5$, the opposite ends of which are attached to a sliding bar, $C^6$, which is composed of two parallel plates of metal, as shown in Fig. 2, in order that flanges which project from brackets D D', secured upon the axle B, may pass between them, and thus form guides for the sliding frames composed of the rods C', arms $C^4$ and $C^5$, and bar $C^6$ to slide upon.

To the outer or forward arm, $C^5$, there is attached one of a pair of draw-bars, E E', the one lettered E being pivoted thereto in such a manner as to allow it to turn upon its pivotal point, the one lettered E' being also secured to the arm $C^5$, but provided with a slot at its inner end, as shown in Fig. 1, in order that when the outer ends of the bars are joined to the clevis $E^2$ they may form a pivotal point for it to turn upon, and at the same time permit the horses to travel nearer to or farther from the row of the crop which is being cultivated without changing the direction of the implement.

The clevis $E^2$ above alluded to consists of a curved bar of metal, the rear edge of which is provided with a projection, as shown in Fig. 2, which enters the space between the bars E and E'. The curved portion of this clevis extends above and below the point where it is joined to the draft-bar, and is provided with a series of holes for the attachment of the single-trees in such a manner that by changing the positions thereof the shovels of the cultivator will be caused to enter the earth to a greater or less depth, according to the requirements of the case and the quality of the soil—as, if the single-trees are attached to the clevises below where they are connected to the draft-bars, the shovels or plows will be caused to enter the earth to a greater depth than when they are attached at or above such point. It will be seen, therefore, that the form of clevis enables the operator to regulate the depth to which the shovels shall enter the earth in all kinds of soil, or in cultivating all kinds of crops which are planted in rows sufficiently far apart to permit this kind of cultivation to be adopted.

The beams of the cultivator, which may be of any approved form, are attached to the rear bars, $C^4$, of the sliding frame, said bars being capable of revolving in their bearings; or the clamps F, which secure the plow-beams thereto, may be made to turn thereon, the object being to make provision for the raising and lowering of the shovels or plows without changing the height of the point to which they are attached. The rear end of the clamp F is provided with two projecting ears, through which passes a bolt or pin, which also passes through projections in bifurcated blocks F', which are attached to the forward ends of the plow-beams, the arrangement of these parts being such that the shovels or plows may be caused to run nearer to or farther from the rows of the crop. Each of the gangs of shovels or plows is provided with a handle, G, by which they may be guided.

In providing for preventing the axle B from being turned out of its proper position, there are applied to the under sides of the brackets D D' arms H H', which extend rearward at a suitable angle to admit of there being attached to their outer ends bars of metal $H^2 H^3$, the lower rear ends of which are enlarged and allowed to rest upon the earth when the implement is being moved from field to field, or at other times, the effect of which is to prevent the weight of the shovels or plows from turning the axle out of position. The bars $H^2 H^3$, just alluded to, are pivoted to the arms H H' in such a manner that their outer ends can be turned up, and thus removed from contact with the earth when desirable to do so, they being held in their operative positions by a slide moving on the arms H H'.

For the purpose of holding the gangs of shovels or plows clear of the earth when the implement is being transported from place to place, and when it is not desirable to have the shovels enter the earth, there are attached to the arms H H' bars of metal I I', which extend upward and rearward sufficiently far to allow the bent rear ends thereof to form resting-places for the beams of the gangs, they being placed therein by the operator raising their rear ends and placing them in position.

It will be seen from the foregoing description and upon reference to the drawings that the implement described and shown constitutes a tongueless cultivator—one which may be advantageously used without such an appendage; but it is not intended to limit the improvement to that type of implements, as the parts and their combinations are applicable to cultivators using tongues as well as to those not using them.

Having thus described my invention, what I claim, and desire to secure by Letters Patent, is—

1. In a straddle-row cultivator, the combination of an arched axle, a sliding frame, to which the forward ends of the beams are connected, and a draw-bar connected to the forward end of said frame, which is capable of lateral play at the draft end, substantially as and for the purpose set forth.

2. The sliding frame composed of rod or bar C', one end of which is provided with a spring, substantially as shown, the cross-bars $C^4$ and $C^5$, and flat grooved guide-bar $C^6$, the parts being constructed and arranged to operate substantially as and for the purpose set forth.

3. The combination, with the axle B, of the sliding frame, the draw-bars E E', the forward ends of which vibrate laterally, and the pivoted clevis $E^2$, substantially as and for the purpose set forth.

In testimony whereof I affix my signature in presence of two witnesses.

LUPPE LUPPEN.

Witnesses:
FREDERICK SMITH,
GEORGE C. COLE.